(12) United States Patent
Takahashi et al.

(10) Patent No.: US 7,468,222 B2
(45) Date of Patent: Dec. 23, 2008

(54) ELECTROCHEMICAL DEVICE

(75) Inventors: Tetsuya Takahashi, Tokyo (JP); Masayuki Ohtsuka, Tokyo (JP); Kunio Miyabara, Tokyo (JP); Saburou Tsuchida, Tokyo (JP); Mitsuyoshi Harano, Tokyo (JP)

(73) Assignee: TDK Corporation, Tokyo (JP)

( * ) Notice: Subject to any disclaimer, the term of this patent is extended or adjusted under 35 U.S.C. 154(b) by 417 days.

(21) Appl. No.: 11/016,719

(22) Filed: Dec. 21, 2004

(65) Prior Publication Data

US 2005/0147880 A1    Jul. 7, 2005

(30) Foreign Application Priority Data

Dec. 26, 2003    (JP)    ............... P2003-434002

(51) Int. Cl.
*H01M 2/04* (2006.01)
*H01M 2/08* (2006.01)
*H01M 4/64* (2006.01)
*H01G 9/10* (2006.01)

(52) U.S. Cl. .............. 429/177; 429/162; 429/185; 429/233; 361/518

(58) Field of Classification Search .......... None
See application file for complete search history.

(56) References Cited

U.S. PATENT DOCUMENTS

| 4,623,599 | A | * | 11/1986 | Vourlis ................. 429/174 |
| 5,486,431 | A | * | 1/1996 | Tuttle et al. ............. 429/66 |
| 5,490,320 | A | | 2/1996 | Hasegawa et al. |
| 6,521,373 | B1 | * | 2/2003 | Suzuki et al. ............ 429/162 |
| 2003/0112581 | A1 | | 6/2003 | Kwon et al. |
| 2003/0129489 | A1 | * | 7/2003 | Kamisuki et al. ........ 429/185 |

FOREIGN PATENT DOCUMENTS

| JP | A 2002-313679 | 10/2002 |
| KR | 0134080 B1 | 12/1997 |
| KR | U-1998-049757 | 10/1998 |
| KR | A-2002-0070392 | 9/2002 |
| KR | 2003-0020459 | 3/2003 |
| WO | WO 02/13290 | 2/2002 |

* cited by examiner

*Primary Examiner*—Jonathan Crepeau
(74) *Attorney, Agent, or Firm*—Oliff & Berridge, PLC

(57) ABSTRACT

An electrochemical device comprises a matrix 60 including an anode 10 and a cathode 20, an electrolyte, and a shell 50 for accommodating the matrix 60 and electrolyte in a closed state. The shell 50 includes an upper lid 52, a lower lid 54, and a gasket 56. At least one of the upper lid 52 and lower lid 54 is formed with a projection protruding toward the matrix 60 so that the upper lid 52 and the anode 10 electrically come into contact with each other and that the lower lid 54 and the cathode 20 electrically come into contact with each other.

14 Claims, 6 Drawing Sheets

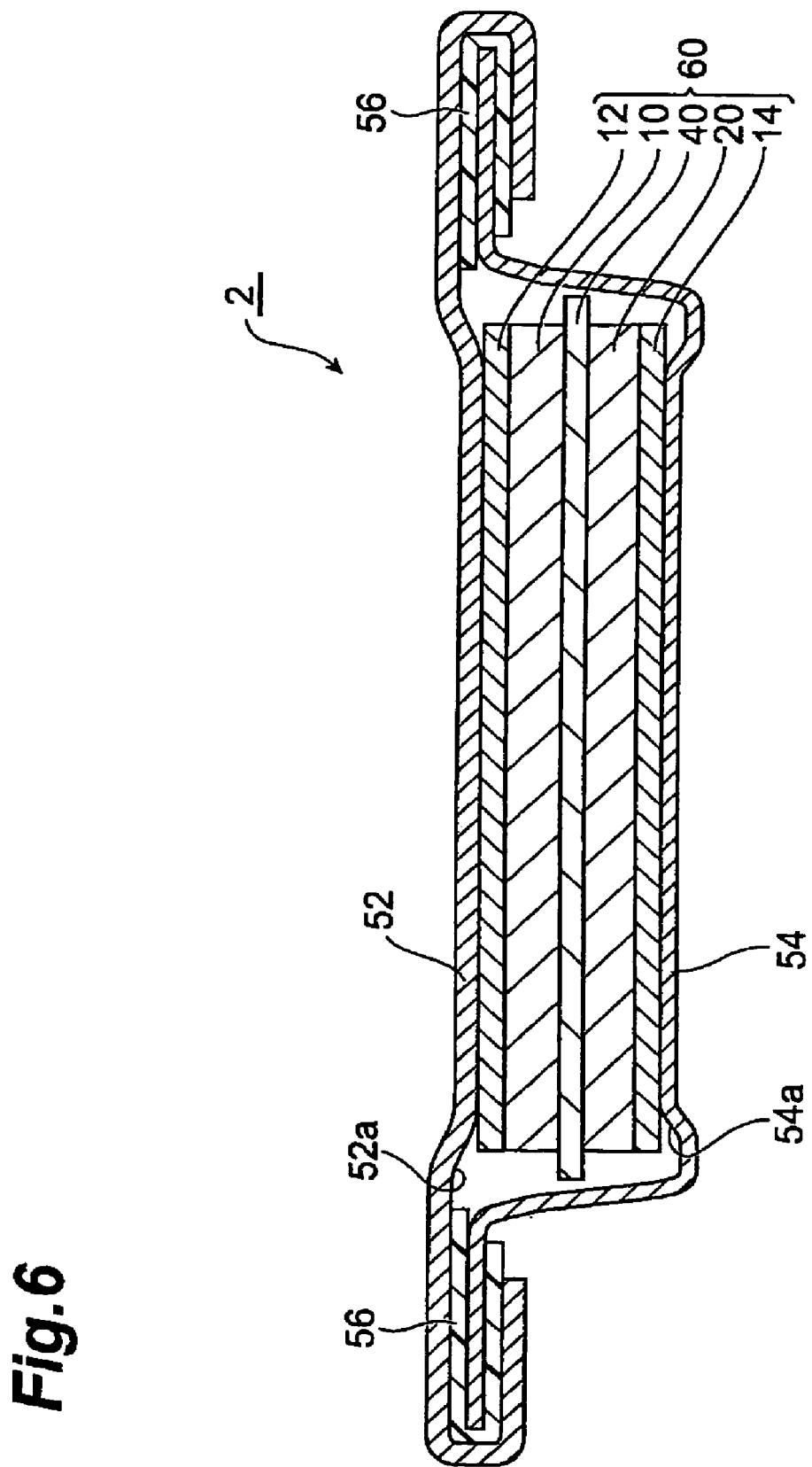

ELECTROCHEMICAL DEVICE

BACKGROUND OF THE INVENTION

1. Field of the Invention

The present invention relates to an electrochemical device; and, more specifically, to an electrochemical device encompassing electrochemical capacitors such as electric double layer capacitors and batteries such as lithium ion secondary batteries.

2. Related Background of the Invention

Electrochemical capacitors such as electric double layer capacitors and batteries such as lithium ion secondary batteries have been expected to become power supplies or backup power supplies for portable devices (small-size electronic devices) and the like, and auxiliary power supplies for electric or hybrid cars, for example, since they are electrochemical devices which can easily reduce their size (thickness) and weight.

Among such electrochemical devices, cells having a form referred to as coin type have been known in general as those of thin type. However, such a coin type cell has a structure in which end parts of upper and lower lids made of a metal constituting a shell are crimped together so as to seal the inside, whereby the shell is required to have a sufficient strength and is needed to be thicker. Therefore, it has been difficult for the coin type electrochemical device to be made smaller (thinner). As the upper and lower lids constituting the shell, those also functioning as external output terminals have been in use in general.

On the other hand, Japanese Patent Application Laid-Open No. 2002-313679, for example, discloses an electric double layer capacitor in which a member (collector metal) constituting the shell also functions as a collector (and an external output terminal), and an end part of the collector metal is bonded with a heat-bonding part without crimping, so as to yield a sealed structure, thereby reducing its size (thickness).

SUMMARY OF THE INVENTION

However, the following problem exists in electrochemical devices which have been made smaller (thinner) as such. Namely, in the structure of the electric double layer capacitor disclosed in the above-mentioned Japanese Patent Application Laid-Open No. 2002-313679, it has been difficult for two collector metals opposing each other, which also act as collectors constituting the shell, to secure sufficient electrical contacts with electrodes constituting a matrix when sealing the matrix into the shell, so that internal resistance may increase, whereby excellent charging/discharging characteristics have been hard to attain.

In view of the above-mentioned problem inherent in the prior art, it is an object of the present invention to provide an electrochemical device in which, in a shell including at least a member to become an external output terminal, the member to become the outer output terminal and an electrode constituting a matrix accommodated in the shell can sufficiently secure an electrical contact therebetween, whereby an excellent charging/discharging characteristic can be obtained.

The inventors conducted diligent studies in order to achieve the above-mentioned object and, as a result, have found that the above-mentioned object can be achieved when at least one of two lids (first and second lids) also acting as external output terminals constituting the shell is formed with a projection protruding toward the matrix, thereby achieving the present invention.

Namely, the present invention provides an electrochemical device comprising, at least, a matrix including first and second electrodes, an electrolyte, and a shell for accommodating the matrix and the electrolyte in a closed state; wherein the shell comprises first and second lids made of a metal opposing each other, and a gasket placed between the first and second lids; wherein the first and second lids and the gasket are arranged so as to define a space for accommodating the matrix; and wherein at least one of the first and second lids is formed with a projection protruding toward the matrix so that the first lid and the first electrode electrically come into contact with each other and that the second lid and the second electrode electrically come into contact with each other.

This electrochemical device can sufficiently secure electrical contacts between the first lid and first electrode and between the second lid and second electrode, since at least one of the first and second lids also functioning as external output terminals is formed with the projection.

The electrochemical device of the present invention can sufficiently secure electrical contacts of the lids constituting the shell with the electrodes constituting the matrix as mentioned above, and thus can reduce the contact resistance between the lids and electrodes, thereby sufficiently lowering the internal resistance in the electrochemical device. Therefore, the electrochemical device of the present invention can attain an excellent charging/discharging characteristic.

When the electrochemical device of the present invention has an electric double layer capacitor structure disclosed in the above-mentioned Japanese Patent Application Laid-Open No. 2002-313679, for example, an electric double layer capacitor having a thin size, a sufficiently lowered internal resistance, and an excellent charging/discharging characteristic can be formed. Further, the electrochemical device of the present invention encompasses electrochemical devices of the above-mentioned conventional coin type. An electrochemical device having a sufficiently lowered internal resistance and an excellent charging/discharging characteristic can also be formed in this case.

Preferably, in the electrochemical device, the projection is formed such that a leading end part thereof electrically comes into contact with the first electrode and/or second electrode while pressing the first electrode and/or second electrode.

In such an electrochemical device, the first and second lids are pressed against the first and second electrodes, respectively, whereby the electrical contacts between the first lid and first electrode and between the second lid and second electrode are secured more fully. Since the projection is formed at the metal lid constituting the shell of the electrochemical device, its rigidity can keep a state sufficiently pressing the first electrode and/or second electrode, whereas the projection is deformed by a pressure applied from the matrix to the projection before an excessive pressure is exerted on the matrix, whereby a favorable electrical contact between the lid and electrode can be attained without damaging the matrix by collapsing, etc.

The electrochemical device of the present invention can sufficiently secure electrical contacts of the lids constituting the shell with the electrodes constituting the matrix as mentioned above, and thus can reduce the contact resistance between the lids and electrodes, thereby sufficiently lowering the internal resistance in the electrochemical device. Therefore, the electrochemical device of the present invention can attain an excellent charging/discharging characteristic.

Preferably, the electrochemical device of the present invention is formed by way of a placing step of placing the matrix within the shell, wherein the matrix, gasket, and first and second lids used in the placing step simultaneously satisfy the conditions represented by the following expressions (1) and (2):

$$T2>T1 \quad (1)$$

$$T3>(T2-T1) \quad (2)$$

where T1 is the thickness of the matrix, T2 is the thickness of the gasket, and T3 is the total height of the projection formed at the first lid and/or second lid.

Here, the thickness of the matrix T1 refers to the thickness in a laminating direction of the first and second electrodes constituting the matrix, whereas the thickness of the gasket T2 refers to the thickness in the same direction as the thickness of the matrix.

The total height T3 of the projection formed at the first lid and/or second lid refers to the height of the projection when only one of the first and second lids is formed with the projection, and to the total of the respective heights of projections when both of the first and second lids are formed with the projections. The height of the projection refers to the height from the lid surface where the projection is formed to the leading end part of the projection. When one lid is formed with two or more projections, the height of the projection refers to the maximum value of the respective heights of the two or more projections.

From the viewpoint of attaining favorable electrical contacts of the lids with the electrodes, it will be preferred if the lids are formed with a projection whose part (leading end part) electrically in contact with the electrode is a flat part having a sufficient area. When two or more projections are formed, it will be preferred if the two or more projections have the same height, each including a leading end having a flat part with a sufficient area.

All of T1, T2, and T3 are represented by the same unit (e.g., µm) and indicate respective values of the members (matrix, gasket, and first and second lids) before forming the electrochemical device.

In the electrochemical device formed by way of the placing step using the members satisfying these conditions, the projection formed at the first lid and/or second lid can attain a state where the first electrode and/or second electrode is securely pressed by its leading end part. This can yield favorable electrical contacts between the first lid and first electrode and between the second lid and second electrode. Here, even when the projection is formed at only one of the first and second lids, the leading end part of the projection pushes one of the first and second electrodes, so that the other electrode is sufficiently pushed by the other lid formed with no projection, whereby favorable electrical contacts of the lids with the electrodes can be attained.

Preferably, in the electrochemical device of the present invention, each of the first and second lids is formed with the projection.

In this case, the respective projections formed at both of the two lids can press the first and second electrodes, thus allowing the lids and electrodes to come into electrical contact with each other more fully than in the case where only one of the first and second lids is formed with the projection. Since sufficient electrical contacts of the lids with the electrodes are secured, the internal resistance of the electrochemical device can be lowered more fully, whereby a better charging/discharging characteristic can be obtained.

The electrochemical device of the present invention may be configured such that a collector having an electronic conductivity is placed between the first lid and first electrode and between the second lid and second electrode, wherein the projection is electrically in contact with the first electrode and/or second electrode by way of the collector.

In this case, the leading end part of the projection pushes the electrode by way of the collector and thus can prevent the electrode from being damaged by the pushing of the leading end part more reliably than in the case without the aid of the collector.

Preferably, in the electrochemical device of the present invention, the projection is formed by drawing the first lid and/or second lid.

Here, the drawing is a process for carrying out so-called deep drawing, and is a forming process using a drawing machine, in which the lid is placed between a pair of molds having a predetermined form and is drawn while being pressed and heated by the molds, so as to form the projection, and then is cooled as necessary.

When formed by the drawing, the projection can easily be deformed by a pressure applied from the matrix to the projection before an excessive pressure is exerted on the matrix, whereby a favorable electrical contact between the lid and electrode can be attained without damaging the matrix by collapsing, etc.

Preferably, in the electrochemical device of the present invention, at least a part of the electrolyte is contained in the first and second electrodes. This allows the electrochemical device to attain a better charging/discharging characteristic.

Preferably, in the electrochemical device of the present invention, the matrix includes an insulating separator disposed between the first and second electrodes, whereas at least a part of the electrolyte is contained in the separator. This allows the electrochemical device to attain a better charging/discharging characteristic.

BRIEF DESCRIPTION OF THE DRAWINGS

FIG. 6 is a schematic sectional view showing another embodiment of the electrochemical device in accordance with the present invention (an electric double layer capacitor).

DESCRIPTION OF THE PREFERRED EMBODIMENTS

Figure 1:
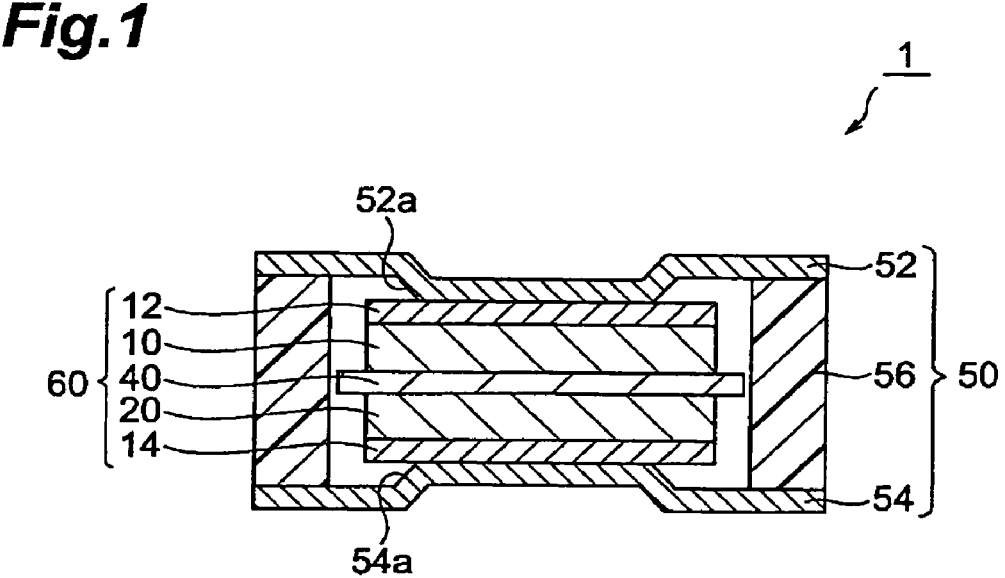
FIG. 1 is a schematic sectional view showing a preferred embodiment of the electrochemical device in accordance with the present invention (an electric double layer capacitor)

In the following, the electrochemical device of the present invention will be explained in detail with reference to its preferred embodiments. In the explanation of the drawings, parts identical or equivalent to each other will be referred to with numerals identical to each other without repeating their overlapping descriptions. Ratios of dimensions in the drawing are not limited to those depicted.

Figure 2:
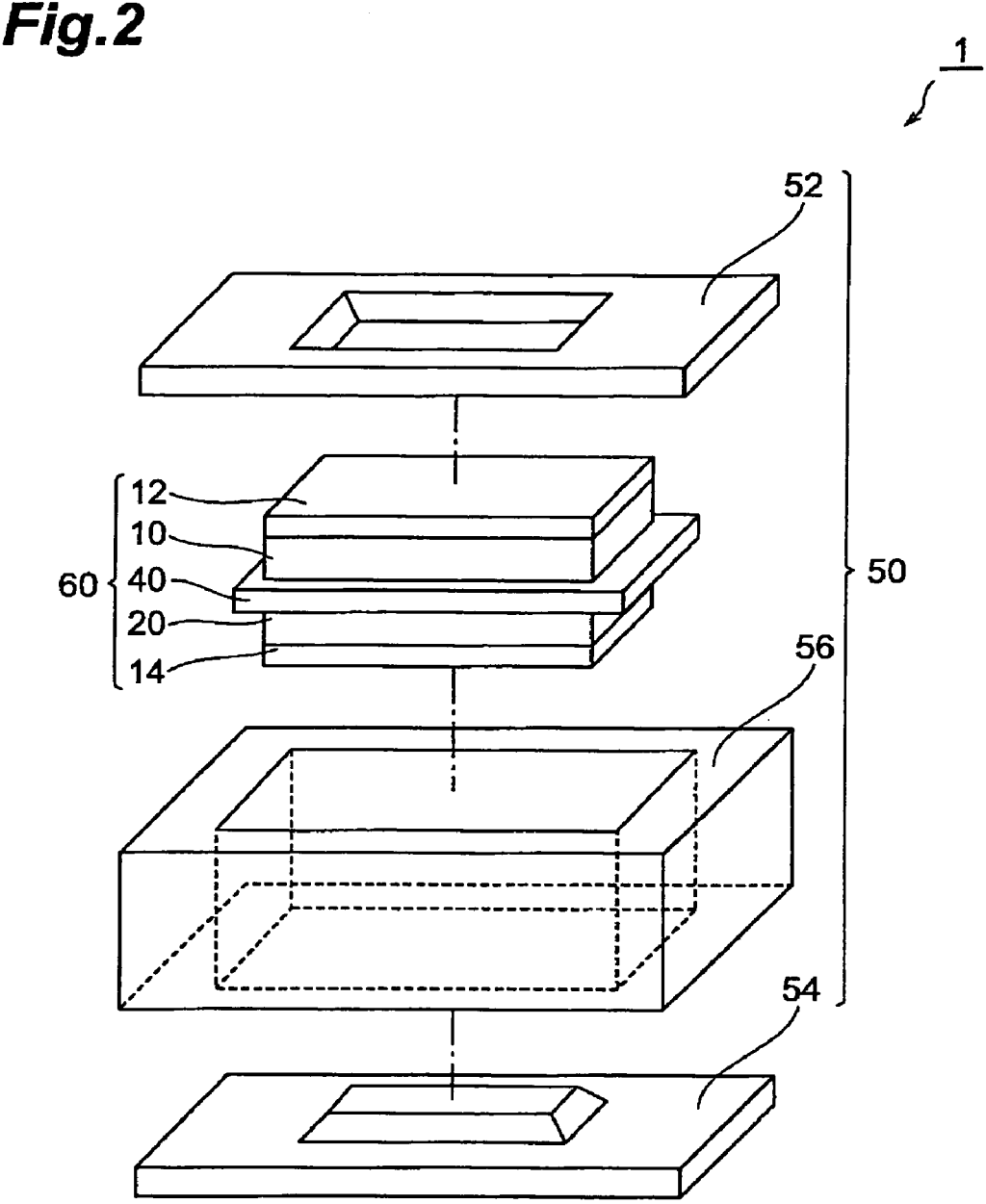
FIG. 2 is an exploded perspective view of the electrochemical device shown in FIG. 1.
Figure 3:
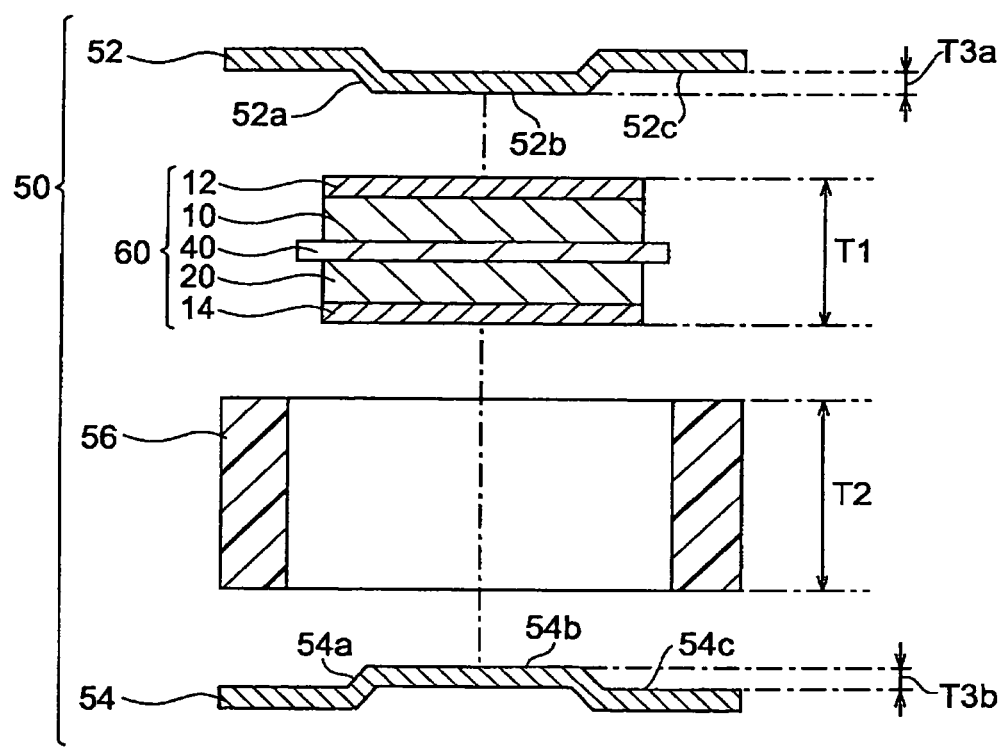
FIG. 3 is an exploded sectional view of the electrochemical device shown in FIG. 1.

FIG. 1 is a schematic sectional view showing a preferred embodiment of the electrochemical device in accordance with the present invention (an electric double layer capacitor). FIG. 2 is an exploded perspective view of the electrochemical device shown in FIG. 1. FIG. 3 is an exploded sectional view of the electrochemical device shown in FIG. 1.

As shown in FIG. 1, the electric double layer capacitor 1 is constituted by a matrix 60 in which an anode collector 12, an anode 10 (first electrode), a separator 40, a cathode 20 (second electrode), and a cathode collector 14 are successively laminated in this order; a liquid electrolyte (not depicted) contained in the anode 10, cathode 20, and separator 40; and a shell 50 accommodating the matrix 60 in a closed state. The shell 50 is constituted by an upper lid 52 (first lid) made of a metal and a lower lid 54 (second lid) made of a metal which oppose each other, and an electrically insulating gasket 56 disposed between the upper lid 52 and lower lid 54. The upper lid 52, lower lid 54, and gasket 56 are arranged so as to define a space for accommodating the matrix 60. The upper lid 52 and lower lid 54 are formed with respective projections 52a and 54a projecting toward the matrix 60. The upper lid 52 and lower lid 54 also function as external output terminals for the electric double layer capacitor 1.

This electric double layer capacitor 1 is formed by accommodating the matrix 60 containing the electrolyte within the shell 50 constituted by the upper lid 52, lower lid 54, and gasket 56, and bonding the upper lid 52, lower lid 54, and gasket 56 to each other into a sealed state. Here, the upper lid 52 and the lower lid 54 are in a state electrically insulated from each other.

In thus configured electric double layer capacitor 1, the upper lid 52 and lower lid 54 are formed with the projections 52a and 54a, respectively, so that a leading end part 52b of the projection 52a is electrically in contact with the anode 10 while pressing the anode 10 by way of the anode collector 12, and a leading end part 54b of the projection 54a is electrically in contact with the cathode 20 while pressing the cathode 20 by way of the cathode collector 14. This can secure a sufficient electrical contact between the upper lid 52 and anode 10 by way of the anode collector 12, and a sufficient electrical contact between the lower lid 54 and cathode 20 by way of the cathode collector 14.

Since electrical contacts between the upper lid 52 and anode 10 and between the lower lid 54 and cathode 20 are sufficiently secured as such, the electric double layer capacitor 1 can sufficiently lower the contact resistances between the upper lid 52 and anode 10 and between the lower lid 54 and cathode 20, thereby fully reducing the internal resistance in the electric double layer capacitor 1. As a result, the electric double layer capacitor 1 can attain an excellent charging/discharging characteristic. Further, since the respective projections 52a and 54a of the upper lid 52 and lower lid 54 press the anode 10 and cathode 20, the upper lid 52 and lower lid 54 stably secure favorable electrical contacts between the upper lid 52 and anode 10 and between the lower lid 54 and cathode 20. Therefore, when making a plurality of electric double layer capacitors 1, fluctuations in resistance among thus manufactured electric double layer capacitors 1 can sufficiently be suppressed, whereby electric double layer capacitors 1 having a stable quality can be obtained.

Preferably, such an electric double layer capacitor 1 is formed by a placing step of placing the matrix 60 within the shell 50, whereas the members (i.e., the matrix 60, gasket 56, upper lid 52, and lower lid 54) used in the placing step simultaneously satisfy the conditions represented by the following expressions (1) and (2):

$$T2 > T1 \quad (1)$$

$$T3 > (T2 - T1) \quad (2)$$

where T1 is the thickness of the matrix 60, T2 is the thickness of the gasket 56, and T3 is the total (T3a+T3b) of the height T3a of the projection 52a formed at the upper lid 52 and the height T3b of the projection 54a formed at the lower lid 54 as shown in FIG. 3.

Here, the height T3a of the projection 52a is the height from a surface 52c of the upper lid 52 where the projection 52a is formed to the leading end part 52b of the projection 52a, whereas the height T3b of the projection 54a is the height from a surface 54c of the lower lid 54 where the projection 54a is formed to the leading end part 54b of the projection 54a.

Here, T3 is appropriately adjusted within a range where the projections 52i a and 54a sufficiently press the anode 10 and cathode 20 by their leading end parts 52b and 5b so as to come into electrical contact therewith without damaging the matrix 60 by collapsing, etc. Within this range, the upper limit of T3 is not restricted in particular.

T1, T2, and T3 are values in the members in a state before forming the electric double layer capacitor 1. When forming the electric double layer capacitor 1, the anode collector 12 and cathode collector 14 constituting the matrix 60 may be deformed upon pressing with the projections 52a and 54a, so that the surfaces of the collectors 12 and 14 are depressed, or the projections 52a and 54a may be pressed by the matrix 60 so as to be deformed, thus lowering their heights (T3a, T3b). Also, for example, the gasket 56 may be compressed by heat and pressure at the time of pressing for forming the electric double layer capacitor 1. Namely, letting T10 be the thickness of the matrix 60, T20 be the thickness of the gasket 56, and T30 be the total of the height T30a of the projection 52a formed at the upper lid 52 and the height T30b of the projection 54b formed at the lower lid 54 after forming the electric double layer capacitor 1, T1, T2, and T3 may differ from T10, T20, and T30, respectively.

When the electric double layer capacitor 1 is formed by using the members satisfying the conditions represented by the above-mentioned expressions (1) and (2), the respective leading ends 52b and 54b of the projections 52a and 54a reliably press the anode 10 and cathode 20. This can yield favorable electrical contacts between the upper lid 52 and anode 10 and between the lower lid 54 and cathode 20, thereby sufficiently lowering the internal resistance of the electric double layer capacitor 1. As a consequence, the electric double layer capacitor 1 can attain an excellent charging/discharging characteristic.

The individual members constituting the electric double layer capacitor 1 will now be explained in detail.

The matrix 60 has a configuration in which the anode collector 12, anode 10 (first electrode), separator 40, cathode 20 (second electrode), and cathode collector 14 are successively laminated in this order.

The "anode" and "cathode" used in the explanation of the electric double layer capacitor 1 are determined with reference to their polarities at the time of discharging the electric double layer capacitor 1 for convenience of explanation.

Each of the anode 10 and cathode 20 constituting the matrix 60 is made of a porous layer containing electronically conductive porous particles.

Materials constituting the porous layer are not restricted in particular, whereby materials similar to those used in porous layers constituting polarizable electrodes such as carbon electrodes employed in known electric double layer capacitors can be used. For example, those mainly composed of carbon materials (e.g., activated carbon) obtained by activating coking coal (e.g., petroleum coke made by a delayed coker from material oils such as bottom oils of fluidized catalytic crackers for petroleum-based heavy oils and residual oils of vacuum distillers) can be used. The other conditions (species of constituent materials other than the carbon materials, such as binders, and their contents) are not restricted in particular. For example, a conductive auxiliary agent (e.g., carbon black) for imparting conductivity to carbon powders, and a binder (e.g., polytetrafluoroethylene (PTFE)) may be added.

As the conductive auxiliary agent, not only carbon black, but also powder graphite and the like can be used. As the binder, not only PTFE but also PVDF, PE, PP, fluorine rubber, and the like can be used.

The anode collector 12 and cathode collector 14 are not restricted in particular as long as they are conductors which can sufficiently transfer electric charges to the anode 10 and cathode 20, respectively, whereby those employed in known electric double layer capacitors can be used. Examples of the conductors include foils made of metals such as aluminum. As the metal foils, those etched or extended can be used without any restriction in particular.

Though not restricted in particular, the thickness of each of the anode collector 12 and cathode collector 14 is preferably 20 to 100 μm, more preferably 20 to 50 μm, from the viewpoint of reducing the size (thickness) and weight of the electric double layer capacitor 1.

The separator 40 disposed between the anode 10 and cathode 20 is not restricted in particular as long as it is formed from an insulating porous member, whereby separators employed in known electric double layer capacitors can be used. Examples of the insulating porous member include laminates of films made of polyethylene, polypropylene, and polyolefin, extended films of mixtures of the resins mentioned above, and fibrous nonwoven made of at least one species of constituent material selected from the group consisting of cellulose, polyester, and polypropylene.

The matrix 60 is one in which the above-mentioned anode collector 12, anode 10, separator 40, cathode 20, and cathode collector 14 are successively laminated in this order. Here, it will be preferred if the anode collector 12, anode 10, cathode 20, and cathode collector 14 have respective side end faces aligning on the same vertical plane. Preferably, a side end face of the separator 40 is formed so as to project out of the above-mentioned side end faces.

The electrolytic solution (not depicted), which is a liquid electrolyte, is contained in the anode 10, cathode 20, and separator 40, and may further fill the inner space of the shell 50.

The electrolytic solution is not restricted in particular, whereby electrolytic solutions (aqueous electrolytic solutions and electrolytic solutions using organic solvents) employed in known electric double layer capacitors can be used. However, the aqueous electrolytic solutions have an electrochemically low decomposition voltage, so that the tolerable voltage of the capacitor is limited to a low level, whereby the electrolytic solution is preferably one (nonaqueous electrolytic solution) using an organic solvent.

Though not restricted in particular, the species of the electrolytic solution is selected in view of the solubility of the solute, the degree of dissociation, and the viscosity of the liquid in general. The electrolytic solution is preferably one having a high electrical conductivity and a high potential window (high decomposition start voltage). Typical examples are those in which quaternary ammonium salts such as tetraethylammonium tetrafluoroborate are dissolved in organic solvents such as propylene carbonate, diethylene carbonate, and acetonitrile. In this case, the moisture mingling therein must be controlled strictly.

In the present invention, the electrolytic solution may not only be in a liquid state, but also be a gel-like electrolyte obtained by adding a gelling agent thereto. Solid electrolytes such as solid polymer electrolytes may be used in place of the liquid electrolyte as well.

The shell 50 accommodating the matrix 60 and electrolytic solution in a closed state is constituted by the upper lid 52, lower lid 54, and gasket 56.

The upper lid 52 and lower lid 54 are not restricted in particular as long as they are made of a metal and are conductors which can sufficiently transfer electric charges. Their examples include nickel foils, aluminum foils, aluminum alloy foils, stainless foils, and copper foils.

The upper lid 52 and lower lid 54 are formed with the projections 52a and 54a protruding toward the matrix 60, respectively. The projections 52a, 54a are formed such that their leading end parts 52b, 54b electrically come into contact with the anode 10 and cathode 20 while pressing the same, respectively.

The forms of the projections 52a and 54a are not restricted in particular as long as they can secure electrical contacts of the upper lid 52 and lower lid 54 with the anode 10 and cathode 20, respectively, without damaging the matrix 60. Preferably, from the viewpoint of more fully lowering the internal resistance of the electric double layer capacitor 1, the projections 52a and 54a are respective projections whose leading end parts 52b and 54b are flat parts each having a sufficient area as mentioned above. When two or more projections 52a, 54a are formed on each of the surfaces of the upper lid 52 and lower lid 54, it will be preferred if the two or more projections have the same height while each of their leading ends is a flat part with a sufficient area. Further, it will be preferred if the area of the flat part in the projection 52a, 54a is at least 5% of the area of the surface (anode collector 12 or cathode collector 14) of the matrix 60 coming into contact with the projection 52a, 54a. This can more fully lower the internal resistance of the electric double layer capacitor 1.

The heights of the projections 52a and 54a (T3a and T3b) are adjusted according to the thickness of the matrix 60 mentioned above, and are not restricted in particular as long as electrical contacts of the upper lid 52 and lower lid 54 with the anode 10 and cathode 20 are sufficiently secured without damaging the matrix 60. Preferably, the heights are adjusted such that the total T3 of the heights (T3a and T3b) of the projections 52a and 54a satisfies the condition of the above-mentioned expression (2).

The gasket 56 is not restricted in particular as long as it is formed from a material which can bond the upper lid 52 and lower lid 54 to each other while in a state electrically insulated from each other, whereby electrically insulating resins adapted to adhere to metals by heat can be used. Examples of such resins forming the gasket 56 include electrically insulating resins such as polypropylene, acid-denatured polypropylene, acid-denatured polyethylene, epoxy resin, PVdF, and PVdC.

The thickness of the gasket 56 is adjusted according to the thickness of the matrix 60 and is not restricted in particular as long as it can form the electric double layer capacitor 1. Preferably, the thickness is adjusted so as to satisfy the conditions of the above-mentioned expressions (1) and (2).

An example of the method of making the above-mentioned electric double layer capacitor 1 will now be explained.

The method of making the matrix 60 is not restricted in particular, whereby known thin-film manufacturing techniques employed in the making of known electric double layer capacitors can be used.

Specifically, constituent materials, such as a carbon material like activated carbon, a conductive auxiliary agent (carbon black or the like) for imparting conductivity, and a binder (PTFE or the like), for forming porous layers to become the anode 10 and cathode 20 are initially put into a solvent (MIBK or the like) adapted to dissolve or disperse the binder and mixed together, so as to prepare a coating liquid for forming the porous layers.

Subsequently, the coating liquid is applied to the anode collector 12 and then is dried, so as to form the anode 10. Here, pressure rolls (mill rolls) may be used for pressing the anode collector 12 and the dried anode 10. In a similar procedure, the cathode 20 is formed on the cathode collector 14.

Next, the separator 40 is placed between the anode 10 formed on the anode collector 12 and the cathode 20 formed on the cathode collector 14 while in a contact state (nonbonding state), so as to form a laminate.

When the electrodes (porous layers) to become the anode 10 and cathode 20 are carbon electrodes (polarizable electrodes) here, sheet-like electrodes (the anode 10 and cathode 20) may be produced by using a carbon material such as activated carbon according to a known method, for example. In this case, for example, the carbon material is pulverized into particles of about 5 to 100 μm, and their granularity is adjusted. Then, a conductive auxiliary agent (carbon black or the like) for imparting conductivity to the carbon particles and a binder (PTFE or the like), for example, are added to and kneaded with the carbon particles, and the resulting kneaded product is extended so as to form a sheet.

Subsequently, while the separator 40 is placed between the anode 10 and cathode 20 in a contact state (nonbonding state), the anode collector 12, anode 10, separator 40, cathode 20, and cathode collector 14 are successively arranged in this order, so as to form a laminate.

Figure 4:
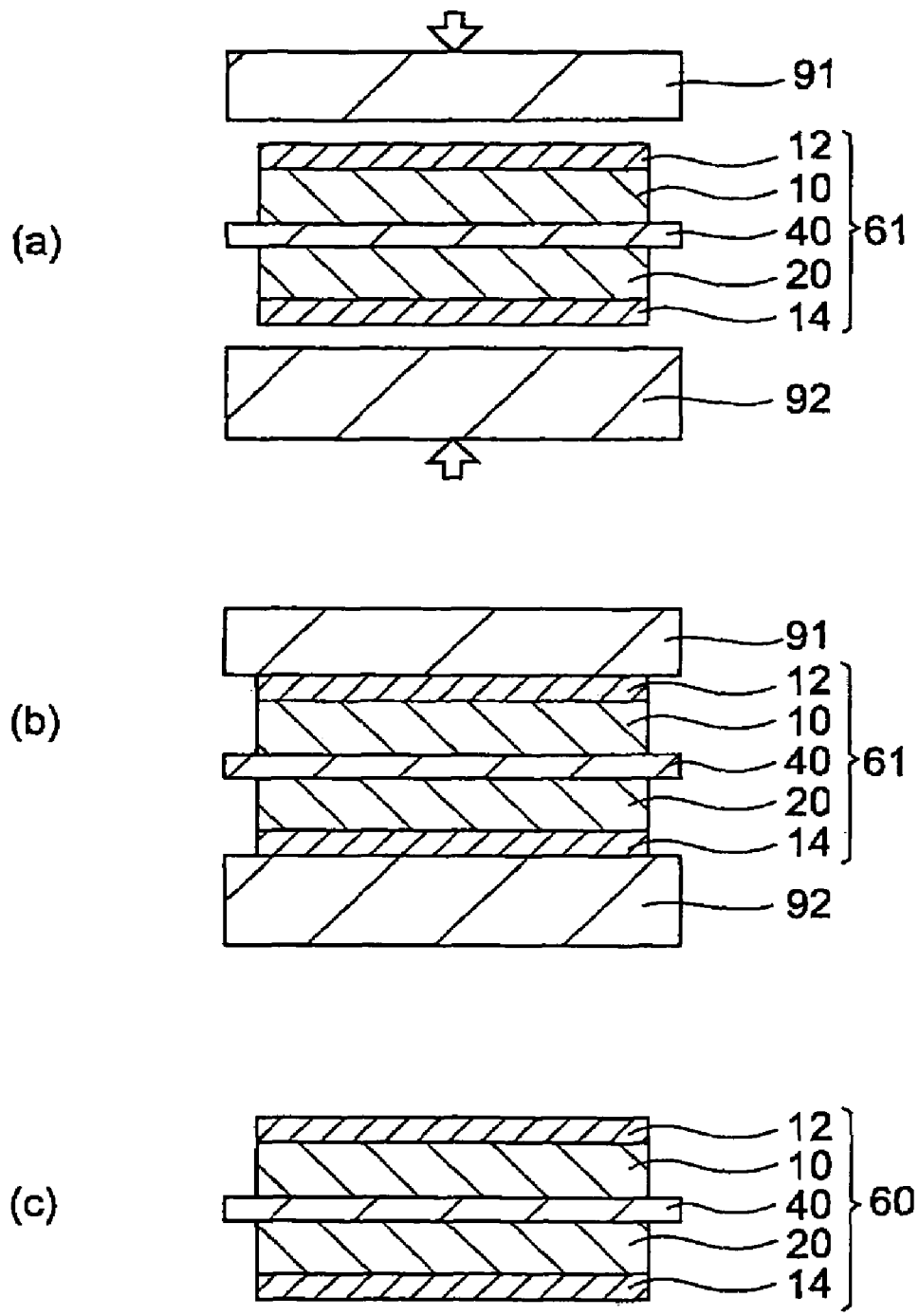
FIG. 4 is an explanatory view showing an example of procedure of heat treatment and pressing.

Next, thus formed laminate is subjected to the following heat treatment and pressing, so as to complete the matrix 60. The heat treatment and pressing will be explained with reference to FIG. 4. FIG. 4 is an explanatory view showing an example of procedure for carrying out the heat treatment and pressing by using means (hot press) which carries out heat treatment and pressing.

First, as shown in (a) of FIG. 4, the above-mentioned laminate 61 is placed between planar molds 91 and 92 which are a pair of heating members. The surface (heating surface) of the mold 91 coming into contact with the laminate 61 and the surface (heating surface) of the mold 92 coming into contact with the laminate 61 are set greater than the surface area of the laminate 61.

Next, as shown in (b) of FIG. 4, the heat treatment and pressing are carried out while the laminate 61 is pressed and heated such that the molds 91 and 92 hold the laminate 61 therebetween. Here, the heat treatment temperature is a temperature at which the separator does not soften, and is preferably within the range of 150° to 250° C. The pressure is preferably 20 to 200 kg/cm². This can yield the matrix 60, which is a laminate in a state where the anode collector 12, anode 10, separator 40, cathode 20, and cathode collector 14 are integrated together as shown in (c) of FIG. 4.

In FIG. 4, (a) is a view showing the laminate 61 before carrying out the heat treatment and pressing, (b) is a view showing the state where the laminate 61 is subjected to the heat treatment and pressing, and (c) is a view showing the matrix 60 obtained by subjecting the laminate 61 to the heat treatment and pressing.

After being formed as mentioned above, the matrix 60 is dipped into an electrolytic solution, and the pressure is reduced, so that the electrolytic solution enters pores of the anode 10, cathode 20, and separator 40.

Next, the matrix 60 and the electrolytic solution contained in the matrix 60 are arranged in the shell 50 composed of the upper lid 52, lower lid 54, and gasket 56, and the matrix 60 is accommodated in the shell 50 while in a closed state.

The projections 52a and 54a in the upper lid 52 and lower lid 54 are formed by drawing the upper lid 52 and lower lid 54 as follows, for example. The procedure for drawing will now be explained with reference to FIG. 5.

Figure 5:
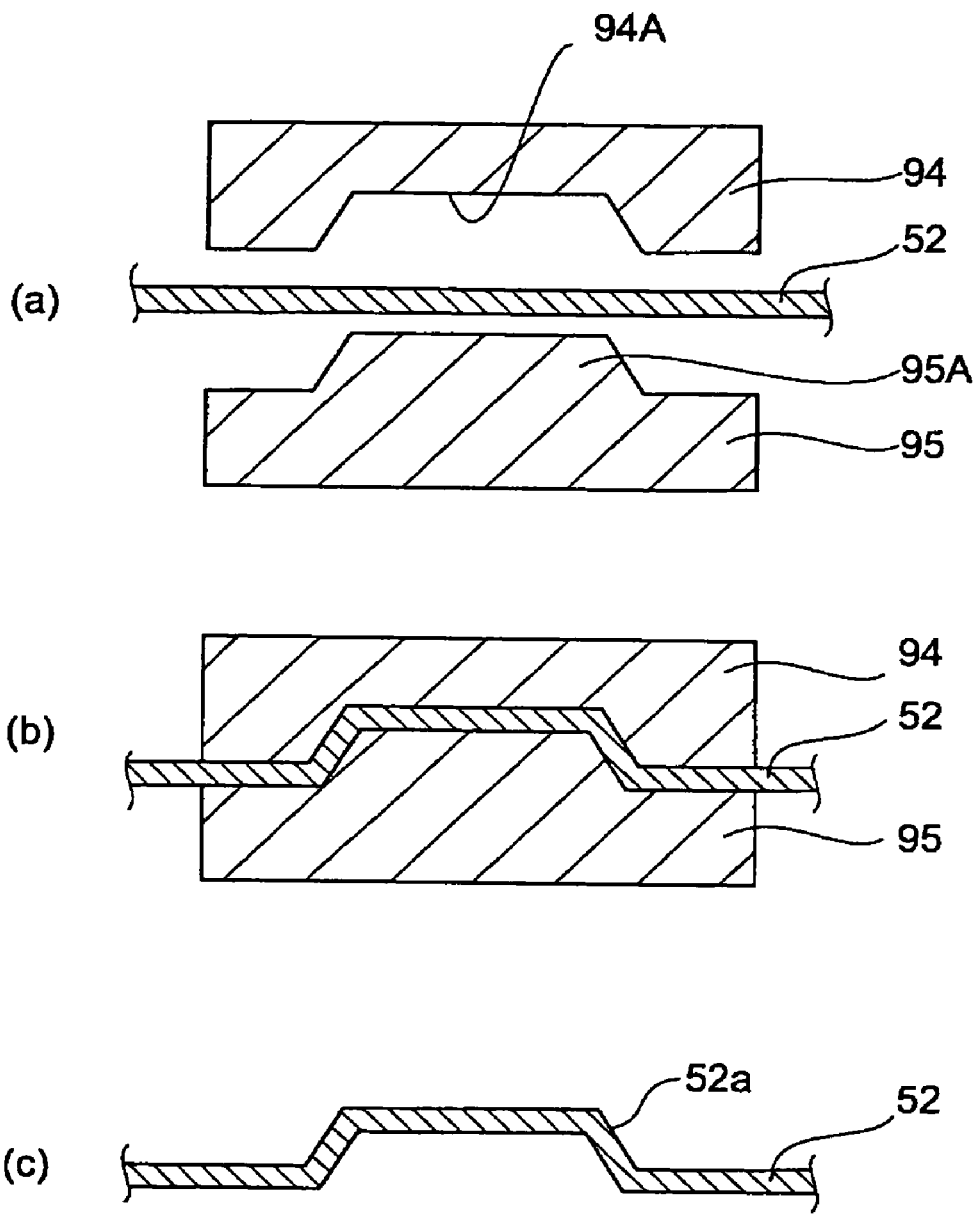
FIG. 5 is an explanatory view for explaining a procedure of drawing a lid.

First, as shown in (a) of FIG. 5, a mold 94 which is a first heating member formed with a groove 94A (depression) having a predetermined form and a predetermined size which are determined according to the size of the matrix 60, and a mold 95 which is a second heating member having a projection 95A taking account of the thickness of the upper lid 52 and the form and size of the groove 94A are prepared, and the upper lid 52 is placed therebetween. In (a) and (b) of FIG. 5, the groove 94A is formed so as to become substantially trapezoidal.

Next, as shown in (b) of FIG. 5, the part of the projection 52a for forming the upper lid 52 is gradually pressed and deformed such that the surface of the mold 94 formed with the groove 94A and the projection 95A of the mold 95 mate each other. Here, at least one of the molds 94 and 95 may be heated to a predetermined temperature (e.g., 20° to 90° C.). Thus, the upper lid 52 formed with the projection 52a is obtained as shown in (c) of FIG. 5. The lower lid 54 may also be subjected to drawing in the same procedure.

In FIG. 5, (a) is a view showing the upper lid 52 before drawing, (b) is a view showing the state where the upper lid 52 is subjected to drawing, and (c) is a view showing the upper lid 52 formed with the projection 52a by drawing.

For accommodating the matrix 60 in the shell 50 constituted by the upper lid 52 and lower lid 54 thus formed with the projections and the gasket 56, the gasket 56 is initially arranged so as to surround the matrix 60, and then the upper lid 52 and lower lid 54 are placed so as to hold the matrix 60 therebetween, thereby forming a structure of the electric double layer capacitor 1 (hereinafter referred to as "device structure") before being closed.

Subsequently, thus formed device structure is subjected to the heat treatment and pressing explained with reference to FIG. 4, so that the upper lid 52, lower lid 54, and gasket 56 are bonded together by heat. Here, the heat treatment temperature falls within a range where the upper lid 52, lower lid 54, and gasket 56 can be bonded together by heat without deteriorating the matrix 60 with heat, and is preferably within the range of 150° to 200° C. The pressure falls within a range where no damages occur in the matrix 60 because of an excessive pressure exerted on the matrix 60, and preferably is 1 to 10 kg/cm². This can form an electric double layer capacitor 1 in which the matrix 60 is accommodated in a closed state in the shell 50 constituted by the upper lid 52, lower lid 54, and gasket 56.

Though a preferred embodiment of the present invention is explained in detail in the foregoing, the present invention is not limited thereto. For example, while the above-mentioned embodiment relates to a case where the matrix 60 includes the anode collector 12 and cathode collector 14, the matrix 60 may be constituted by the anode 10, cathode 20, and separator 40 without collectors. In this case, the upper lid 52 and lower lid 54 also function as the anode collector 12 and cathode collector 14, respectively.

Though the above-mentioned embodiment relates to a case where the matrix 60 includes the anode collector 12, anode 10, separator 40, cathode 20, and cathode collector 14 one by one, the matrix 60 may comprise two or more laminates each comprising the anode 10, separator 40, and cathode 20, whereas a collector may be disposed between each pair of the two or more unit laminates.

The electric double layer capacitor explained in the above-mentioned embodiment may be a coin type electric double layer capacitor 2 as shown in FIG. 6. In this case, the lower lid 54 comprises a cylindrical part having a closed lower end and an opening upper end, and a brim formed like a ring projecting outward from the upper end portion of the cylindrical part. The end part of the upper lid 52 is crimped on the brim of the lower lid 54 while holding the brim from the upper and lower sides by way of an insulating gasket 56. Except for this point, the electric double layer capacitor 2 has the same configuration as that in the above-mentioned embodiment.

Further, though the above-mentioned embodiment relates to a case where the electrochemical device is an electric double layer capacitor, the electrochemical device of the present invention is not limited to the electric double layer capacitor, but may be an electrochemical capacitor such as pseudocapacity capacitor, pseudocapacitor, and redox capacitor, or a secondary battery such as lithium ion secondary battery or a primary battery, for example.

EXAMPLES

In the following, the present invention will be explained more specifically with reference to Examples and Comparative Examples, which do not restrict the present invention.

Example 1

In the following procedure, an electric double layer capacitor having the same configuration as with the electric double layer capacitor 1 shown in FIG. 1 was made.

(1) Making of Matrix

The anode (first electrode) and cathode (second electrode) were made by the following procedure. First, the activated carbon material (activated carbon), a thermoplastic resin (fluorine rubber) to become a binder, and a conductive auxiliary agent (carbon black) were compounded such that their mass ratios became carbon material/conductive auxiliary agent/binder=8:1:1, and the resulting mixture was put into MIBK (methylisobutylketone), which was a solvent, and mixed therewith, so as to prepare a coating liquid for forming an electrode (hereinafter referred to as "coating liquid L1").

Subsequently, this coating liquid L1 was uniformly applied to one surface of a collector (having a thickness of 20 μm) made of an aluminum foil. Thereafter, MIBK was eliminated from the coating film by drying, and pressure rolls were used for pressing a laminate made of the collector and the dried coating film, so as to produce a laminate in which an electronically conductive porous layer (a layer having a thickness of 10 μm to become an anode or cathode) is formed on one face of the collector made of the aluminum foil.

Next, by a punching die, the laminate was cut into two pieces each having a size of 7.2 mm×7.2 mm. Thus obtained two laminates were arranged so as to hold therebetween a separator (7.4 mm×7.4 mm with a thickness of 50 μm) made of regenerated cellulose nonwoven fabric. Subsequently, using means (hot press) for carrying out heat treatment and pressing shown in FIG. 4, the two laminates and the separator were bonded together by heat under pressure. The heat treatment temperature was 230° C., the pressure was 90 kg/cm$^2$, and the processing time was 40 seconds. This produced a matrix in which the anode collector, anode, separator, and cathode collector were successively laminated in this order.

Next, an electrolytic solution (a propylene carbonate solution containing 1.2 mol/L of triethylmethylammonium tetrafluoroboride) was injected into thus obtained matrix under reduced pressure (2 to 10 mmHg), and then the pressure was returned to the atmospheric pressure, at which the excess of the electrolytic solution was wiped away, whereby a matrix containing the electrolytic solution was made. Here, the thickness T1 of the matrix was 90 μm.

(2) Making of Electric Double Layer Capacitor

A gasket made of acid-denatured polypropylene (with a thickness T2 of 150 μm) having an outer size of 12 mm×12 mm with a center area of 7.5 mm×7.5 mm punched out was placed so as to surround the above-mentioned matrix containing the electrolytic solution, and was held between upper and lower lids (each having a thickness of 20 μm) made of nickel foils, each having an outer size of 12 mm×12 mm formed with a drawn projection having a height (T3a or T3b) of 50 μm with a flat part within the area of 7.4 mm×7.4 mm at the center portion, whereby a device structure was formed.

Next, using the means (hot press) for carrying out heat treatment and pressing shown in FIG. 4, the above-mentioned device structure was pressed while in a state holding a spacer having a thickness of 150 μm therein, whereby the upper lid, lower lid, and gasket were bonded together by heat. The heat treatment temperature was 200° C., the pressure was 15 kg/cm$^2$, and the processing time was 5 seconds. This produced an electric double layer capacitor having a total thickness of 150 μm in the same configuration as that shown in FIG. 1. In the electric double layer capacitor of Example 1, the projection formed at the upper lid was electrically in contact with the anode while in a state where its leading end part pushed the anode, whereas the projection formed at the lower lid was electrically in contact with the cathode while in a state where its leading end part pushed the cathode.

Comparative Example 1

An electric double layer capacitor having a total thickness of 130 μm was made as in Example 1 except that pressing was carried out by using flat lids having no projections as the upper and lower lids, a gasket with a thickness of 90 μm, and a spacer with a thickness of 130 μm.

Comparative Example 2

An electric double layer capacitor having a total thickness of 125 μm was made as in Example 1 except that pressing was carried out by using flat lids having no projections as the upper and lower lids and a gasket with a thickness of 90 μm without the spacer.

Comparative Example 3

An electric double layer capacitor having a total thickness of 190 μm was made as in Example 1 except that flat lids having no projections were used as the upper and lower lids, and only heating was carried out under reduced pressure (2 to 10 mmHg) while heating members were kept in contact with the upper and lower lids without pressing, so that the upper lid, lower lid, and gasket were bonded together by heat.

Electrochemical Device Characteristic Evaluation Test (1) Measurement of Equivalent Series Resistance Five samples each of the electric double layer capacitors of Example 1 and Comparative Examples 1 to 3 were made. In the following manner, the equivalent series resistance (ESR) of each of the five samples (Nos. 1 to 5) was measured. Namely, ESR [Ω] was calculated from the amount of change in voltage obtained when a current of 10 mA was caused to flow with a frequency of 1 kHz at a measurement environment temperature of 25° C. and a relative humidity of 60%. Table 1 shows results.

(2) Charging Test

When sample Nos. 1 to 5 of the electric double layer capacitors in accordance with Example 1 and Comparative Examples 1 to 3 were subjected to constant current charging, sample No. 3 in Comparative Example 1 and sample Nos. 1 to 5 in Comparative Example 2 could not be charged. Therefore, each of sample No. 3 in Comparative Example 1 and sample Nos. 1 to 5 in Comparative Example 2 seemed to have collapsed its matrix and short-circuited.

TABLE 1

| | ESR [Ω] | | | | |
|---|---|---|---|---|---|
| | No. 1 | No. 2 | No. 3 | No. 4 | No. 5 |
| Example 1 | 12.6 | 12.6 | 12.3 | 11.7 | 12.5 |
| Comparative Example 1 | 18.1 | 11.4 | 2.1 | 13.3 | 14.1 |
| Comparative Example 2 | 3.4 | 2.2 | 1.8 | 5.4 | 1.9 |
| Comparative Example 3 | more than $1 \times 10^6$ | $7.2 \times 10^5$ | more than $1 \times 10^6$ | more than $1 \times 10^6$ | more than $1 \times 10^6$ |

The results shown in Table 1 and results of the charging test proved that the electric double layer capacitor of Example 1 was less likely to collapse its matrix and sufficiently reduced its internal resistance as compared with the comparative examples. Also, it was seen that the fluctuation in internal resistance among the electric double layer capacitors was sufficiently reduced in the case where a plurality of electric double layer capacitors were made.

The foregoing has verified that the electrochemical device of the present invention sufficiently secures electrical contacts of the upper and lower lids with the anode and cathode without damaging the matrix by collapsing, etc., whereby the internal resistance is fully lowered. This has proved that the electrochemical device of the present invention can yield an excellent charging/discharging characteristic.

As explained in the foregoing, the electrochemical device of the present invention can sufficiently secure electrical contacts of two lids, which also function as external output terminals constituting the shell, with electrodes constituting the matrix, thereby fully lowering the internal resistance and yielding an excellent charging/discharging characteristic.

What is claimed is:

1. An electrochemical device comprising:
   a matrix including first and second electrodes;
   an electrolyte; and
   a shell for accommodating the matrix and the electrolyte in a closed state,
   wherein the shell includes first and second lids made of a metal opposing each other, and a gasket placed between the first and second lids;
   wherein the first and second lids and the gasket are arranged so as to define a space for accommodating the matrix;
   wherein at least one of the first and second lids is formed with a projection protruding toward the matrix so that the first lid and the first electrode electrically come into contact with each other and that the second lid and the second electrode electrically come into contact with each other, and the projection has a leading end part that is a flat part, at least one of the first and second lids contacts the matrix only at the leading end part of the projection formed on the one of the first and second lids;
   wherein the electrochemical device is formed by a placing step of placing the matrix within the shell;
   wherein the matrix, the gasket, and the first and second lids used in the placing step simultaneously satisfy conditions represented by the following expressions (1) and (2):

$$T2 > T1 \tag{1},$$

$$T3 > (T2 - T1) \tag{2}$$

where T1 is the thickness of the matrix, T2 is the thickness of the gasket, and T3 is the total height of the projection formed at the first lid and/or the second lid; and
   wherein the electrochemical device is rectangular.

2. An electrochemical device according to claim 1, wherein each of the first and second lids is formed with the projection.

3. An electrochemical device according to claim 1, wherein a collector having an electronic conductivity is placed between the first lid and first electrode and between the second lid and second electrode; and
   wherein the projection is electrically in contact with the first electrode and/or second electrode by way of the collector.

4. An electrochemical device according to claim 1, wherein the projection is formed by drawing the first lid and/or second lid.

5. An electrochemical device according to claim 1, wherein at least a part of the electrolyte is contained in the first and second electrodes.

6. An electrochemical device according to claim 1, wherein the matrix includes an insulating separator disposed between the first and second electrodes.

7. An electrochemical device according to claim 6, wherein at least a part of the electrolyte is contained in the separator.

8. An electrochemical device according to claim 1,
   wherein the first lid is formed with the projection;
   wherein the first lid has a surface adjacent to the first electrode, the surface of the first lid having a first area receiving pressure from wherein the projection is formed on the first lid; and
   wherein around the first area is a second area not receiving the pressure from the projection of the first lid.

9. An electrochemical device according to claim 1,
   wherein the second lid is formed with the projection;
   wherein the second lid has a surface adjacent to the second electrode, the surface of the second lid having a first area receiving pressure from wherein the projection is formed on the second lid; and
   wherein around the first area is a second area not receiving the pressure from the projection of the second lid.

10. An electrochemical device according to claim 8,
    wherein the second lid is formed with the projection;
    wherein the second lid has a surface adjacent to the second electrode, the surface of the second lid having a first area receiving the pressure from wherein the projection is formed on the second lid; and
    wherein around the first area is a second area not receiving the pressure from the projection of the second lid.

11. The electrochemical device according to claim 1,
    wherein the first and second lids have substantially a same shape.

12. An electrochemical device comprising:
a matrix including first and second electrodes;
an electrolyte; and
a shell for accommodating the matrix and the electrolyte in a closed state,
wherein the shell includes first and second lids made of a metal opposing each other, and a gasket placed between the first and second lids;
wherein the first and second lids and the gasket are arranged so as to define a space for accommodating the matrix;
wherein at least one of the first and second lids is formed with a projection protruding toward the matrix so that the first lid and the first electrode electrically come into contact with each other and that the second lid and the second electrode electrically come into contact with each other, and the projection has a leading end part that is a flat part, at least one of the first and second lids contacts the matrix only at the leading end part of the projection formed on the one of the first and second lids;
wherein the electrochemical device is formed by a placing step of placing the matrix within the shell;
wherein the matrix, the gasket, and the first and second lids used in the placing step simultaneously satisfy conditions represented by the following expressions (1) and (2):

$$T2 > T1 \quad (1), \text{and}$$

$$T3 > (T2 - T1) \quad (2)$$

where T1 is the thickness of the matrix, T2 is the thickness of the gasket, and T3 is the total height of the projection formed at the first lid and/or the second lid; and
wherein the first and second lids have substantially a same shape.

13. The electrochemical device according to claim 1,
wherein an area of the flat part of the projection is at least 5% of an area of the surface of the matrix that contacts the projection.

14. The electrochemical device according to claim 12,
wherein an area of the flat part of the projection is at least 5% of an area of the surface of the matrix that contacts the projection.

\* \* \* \* \*